United States Patent [19]

McDonald et al.

[11] Patent Number: 4,540,641

[45] Date of Patent: Sep. 10, 1985

[54] ELECTROCHEMICAL CELL

[75] Inventors: Robert C. McDonald, Stow; Wei-Tao Wang, Stoneham; Peter Cukor, Natick; Michael F. Rubner, Chelmsford, all of Mass.

[73] Assignees: GTE Communications Products Corporation; GTE Laboratories Incorporated, both of Waltham, Mass.

[21] Appl. No.: 514,729

[22] Filed: Jul. 18, 1983

[51] Int. Cl.$^3$ .............................................. H01M 4/36
[52] U.S. Cl. .................................... 429/105; 429/196
[58] Field of Search ............... 429/101, 103, 194, 196, 429/199, 208, 212, 245, 105

[56] References Cited

U.S. PATENT DOCUMENTS

| 3,971,748 | 7/1976 | Wang et al. | 429/212 |
| 4,219,443 | 8/1980 | Klinedinst et al. | 429/196 |
| 4,321,114 | 3/1982 | MacDiarmid et al. | 429/199 |
| 4,367,266 | 1/1983 | Kalnoki-Kis | 429/101 |
| 4,416,915 | 11/1983 | Palmer et al. | 429/103 |

Primary Examiner—Charles F. LeFevour
Attorney, Agent, or Firm—David M. Keay

[57] ABSTRACT

A primary electrochemical cell having an oxidizable active anode material, a cathode current collector, and an electrolytic solution comprising a liquid cathode material and an electrolyte solute dissolved therein. The cathode current collector includes a polymer selected from the group consisting of polyenes, polyphenylenes, polyheterocyclics, mixtures thereof, copolymers thereof, and cross linked polymers thereof.

10 Claims, 4 Drawing Figures

ELECTROCHEMICAL CELL

BACKGROUND OF THE INVENTION

This invention relates to electrochemical cells. More particularly, it is concerned with primary electrochemical cells having an oxidizable active anode material, a cathode current collector, and an electrolytic solution comprising a reducible liquid cathode material and an electrolyte solute dissolved therein.

A particularly effective class of primary electrochemical cells which employs soluble or liquid cathode materials, as opposed to the more conventional solid cathode cells, has undergone rapid development in recent years. In these cells, the active cathode material is usually a fluid solvent for an electrolyte solute which provides conductivity. The active anode of the cell is usually lithium or other highly electropositive metal. During discharge the solvent is electrochemically reduced on a cathode current collector.

A wide variety of materials have been employed to make up cathode current collectors. For example, improved cathode current collectors and methods of making them are described in U.S. Pat. No. 4,219,443 to Keith A. Klinedinst and Francis G. Murphy and in U.S. Pat. No. 4,272,593 to Keith A. Klinedinst.

SUMMARY OF THE INVENTION

It is an object of the present invention to provide an electrochemical cell with an improved cathode current collector.

It is another object of the present invention to provide an electrochemical cell with an improved cathode current collector having high current carrying capabilities.

It is also an object of the present invention to provide an electrochemical cell with an improved cathode current collector which enables high current densities and high operating voltages.

These and other objects are accomplished in electrochemical cells in accordance with the present invention comprising an oxidizable active anode material, a cathode current collector which includes a polymer selected from the group consisting of polyenes, polyphenylenes, polyheterocyclics, mixtures thereof, copolymers thereof, and cross linked polymers thereof, and an electrolytic solution, in contact with the anode material and cathode current collector, comprising a reducible liquid cathode material and an electrolyte solute dissolved therein.

The polymers may be polyenes, for example polyacetylene, polymethylacetylene, polyphenylacetylene, and their derivatives. Examples of polyphenylenes include polyphenylene oxide, polyphenylene sulfide, and their derivatives. The polyheterocyclics may include, for example, polythiophene, and polypyrrole and their derivatives. In addition to the polymers the copolymers and cross linked polymers of the these materials may also be employed. A polymer employed in electrochemical cells in accordance with the present invention may be conductive or may be nonconductive. A polymer may include, or be doped with, an added material which enhances itss conductivity but does not alter its nature as a polymer. Doping of the polymer may result from contact with the electrolytic solution.

For a better understanding of the present invention, together with other and further objects, advantages, and capabilities thereof, reference is made to the following discussion and appended claims in connection with the above-described drawings.

DETAILED DESCRIPTION OF THE INVENTION

Electrochemical cells in accordance with the present invention employ an anode, a cathode current collector, and an electrolytic solution which is in contact with the anode and cathode current collector. The anode and cathode current collector are separated from each other as by a thin porous layer of insulating material. The electrolytic solution comprises a fluid, reducible soluble cathode material with an electrolyte solute dissolved therein.

The anode is an oxidizable material and is preferably lithium metal. Other oxidizable materials which may be employed in electrochemical cells of this type include other alkali metals and also alkaline earth metals. The electrolytic solution comprises a solvent of a reducible liquid cathode material. Among the cathode materials found useful are fluid oxyhalides, fluid non-metallic oxides, fluid non-metallic halides, and the mixtures thereof. An electrolyte solute is dissolved in the solvent in order to raise its conductivity. A thorough discussion of various useful anode materials, cathode solvents, and electrolyte solutes is provided in the above-mentioned patent to Klinedinst and Murphy.

In accordance with the present invention the cathode current collector includes a polymer which may be in the form of a thin film or layer adherent to a conductive substrate of an inert conductive material. Alternatively, the cathode current collector may include the polymer intermixed with carbon black and pressed onto a screen of an inert conductive material.

The following examples are for the purpose of further illustrating and explaining the present invention, and are not to be taken as limiting the scope thereof.

EXAMPLE I

An electrochemical cell was fabricated employing a 3.5 ml thick film of cis-rich polyacetylene on a nickel screen as the cathode current collector. The cell employed an anode of lithium separated from the cathode current collector by non-woven glass separator paper. The electrolytic solution and doping medium was 1.8 lithium tetrachloroaluminate in thionyl chloride. The cell was short circuited and the initial short circuit current was 6 A/cm$^2$ and remained at above 500 mA/cm$^2$ for 100 seconds. The typical maximum short circuit current density in cells employing cathode current collectors of carbon black is approximately 300 mA/cm$^2$. Thus, the cathode current collector of polyacetylene film provided a much higher current carrying capability.

EXAMPLE II

Figure 1:
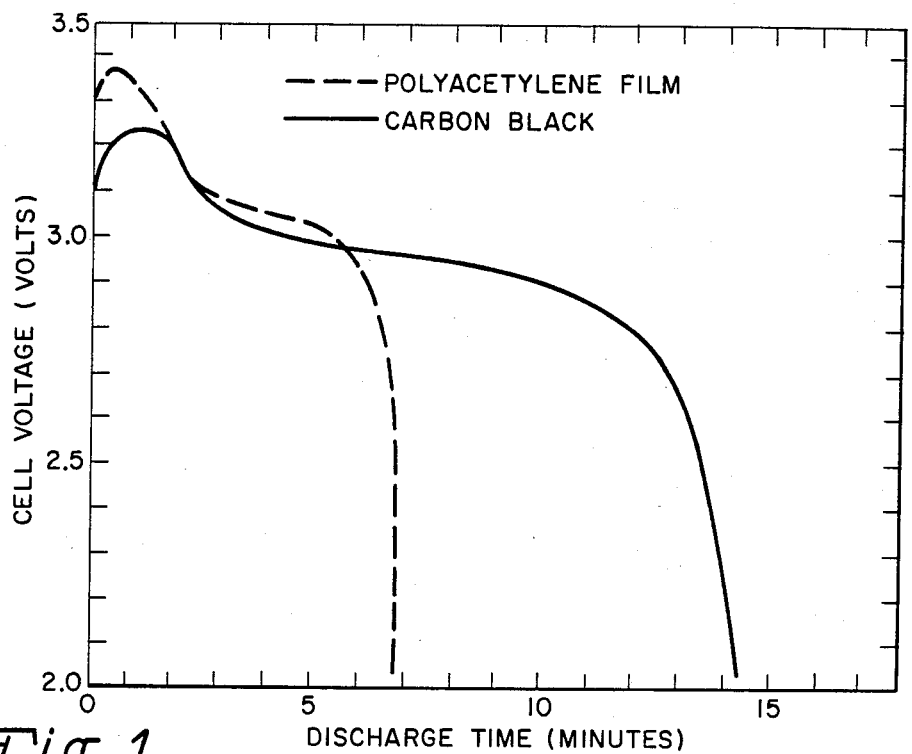
FIGS. 1-4 of the drawings illustrate discharge curves of electrochemical cells employing cathode current collectors in accordance with the present invention in comparison with discharge curves of electrochemical cells employing known cathode current collectors.

An electrochemical cell was fabricated employing a cathode current collector and an anode as in Example I, but containing an electrolytic solution and doping medium of 2.35 M aluminum chloride and 0.15 M lithium tetrachloroaluminate in thionyl chloride as the electrolytic solution. The cell was discharged at a rate of 35 mA/cm$^2$ using an external constant current power supply. The discharge curve of cell voltage versus time is shown in FIG. 1. A similar cell except for the cathode current collector which was of carbon black was discharged in a similar manner and the discharge curve of voltage versus time is also shown in FIG. 1. The cell capacity to a 2.5 volt cutoff for the cell employing polyacetylene was 6.52 mA.h/cm$^2$, and for the cell employing carbon black was 13.10 mA.h/cm$^2$. The cell employing the polyacetylene cathode current collector produced a higher load voltage than the cell employing carbon black.

EXAMPLE III

A thin film, 5 mil thick, of polythiophene was electropolymerized on a nickel foil substrate and employed as the cathode current collector in a cell employing an electrolytic solution of 1.8 M lithium tetrachloroaluminate in thionyl chloride. The cell was discharged at a rate of 10 mA/cm$^2$. The capacity to a cutoff of 2.5 volts was 1.95 mA.h/cm$^2$.

EXAMPLE IV

Figure 2:
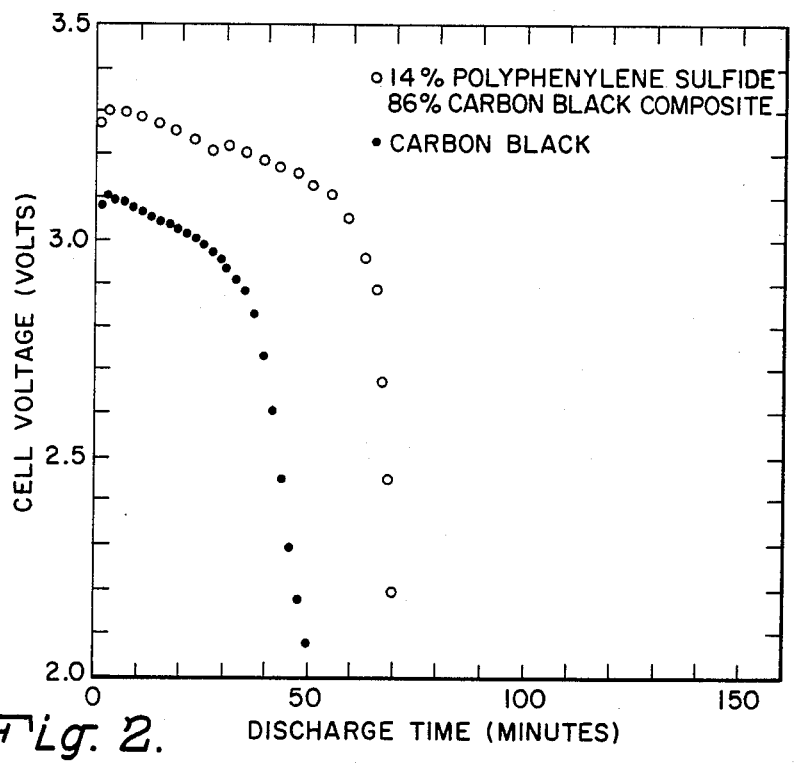

A cathode current collector was prepared by mixing together about 14% by weight polyphenylene sulfide and Shawinigan carbon black. The mixture was pressed onto a nickel screen to form a cathode current collector having dimensions of 1.38 inch x 1.83 inch x 0.021 inch. The cathode current collector was assembled in a cell employing a lithium anode 1.50 inch x 1.96 inch x 0.044 inch which was separated from the cathode current collector by glass separator paper 0.007 inch thick. The electrolytic solution for the cell was 1.0 M lithium tetrachloroaluminate and 0.2 M aluminum chloride in thionyl chloride. A load of 10.9 ohms was connected across the cell. FIG. 2 shows the discharge curve of voltage versus time for the cell. The cell had a capacity of 21.2 mA.h/cm$^2$ taken to a cutoff voltage of 2.5 volts. A conventional cell which was similar except that the cathode current collector employed only carbon black and contained no polymers was discharged under the same conditions. The discharge curve of the cell containing only carbon black is also shown in FIG. 2. The conventional cell had a capacity of 12.0 mA.h/cm$^2$ to a cutoff voltage of 2.5 volts. Thus, the use of the polyphenylene sulfide increased the capacity of the cell by 94%. In addition, both cell voltage and cell current were higher for the cell employing the polyphenylene sulfide.

EXAMPLE V

Figure 3:
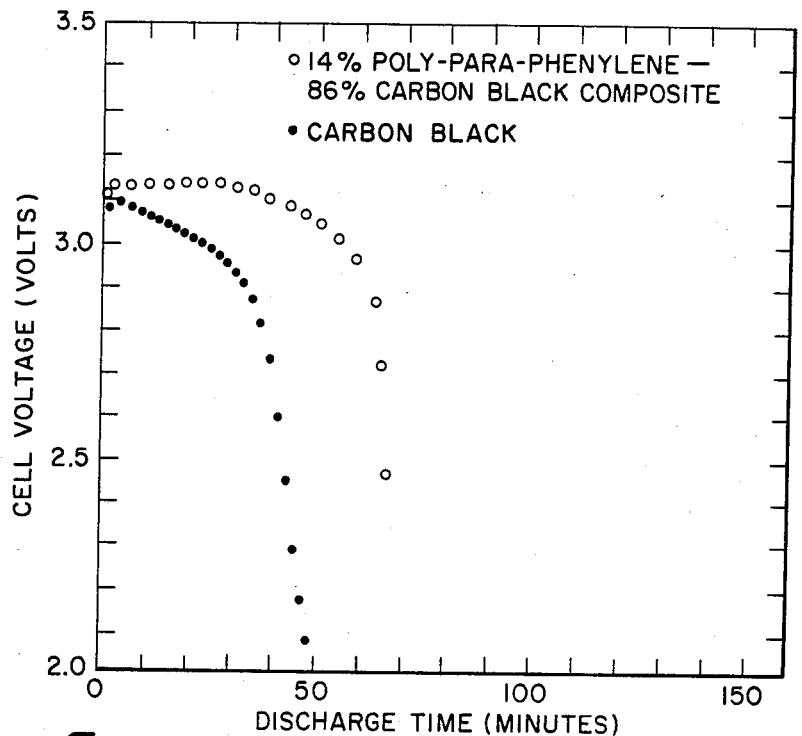

A cell in accordance with the invention which was similar to that of Example IV but employed approximately 14% by weight poly-para-phenylene together with Shawinigan carbon black was fabricated and tested under the same conditions as the cells of Example IV. The discharge curve of cell voltage versus time is illustrated in FIG. 3 in comparison with the conventional cell described under Example IV. The cell employing the poly-para-phenylene had a cell capacity to a cutoff of 2.5 volts of 19.4 mA.h/cm$^2$, an improvement of 78% over the capacity of the conventional cell employing only carbon black. In addition, both cell voltage and cell current were also higher.

EXAMPLE VI

Figure 4:
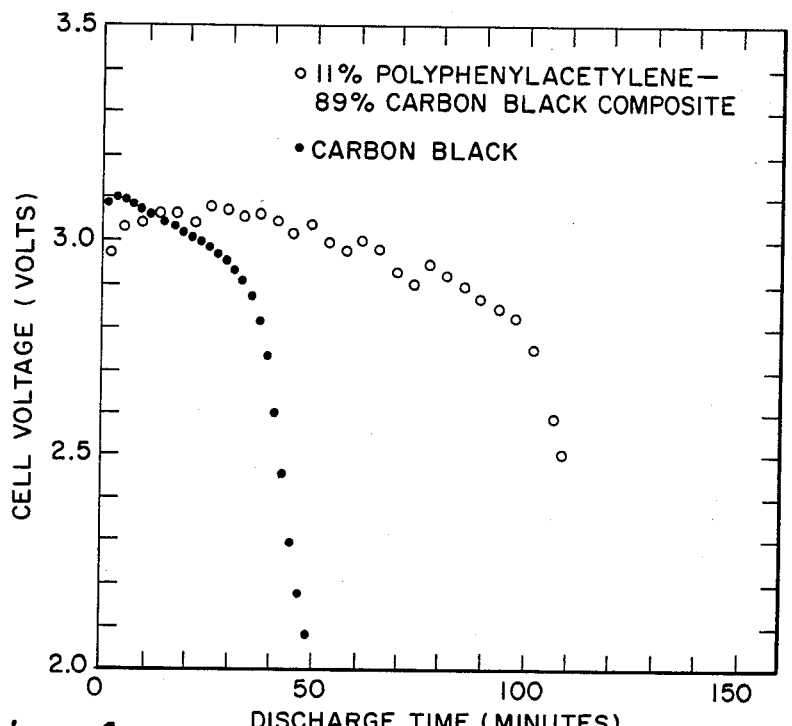

Another cell in accordance with the present invention similar to that of Examples IV and V was constructed employing as the cathode current collector a mixture of 11% by weight polyphenylacetylene and Shawinigan carbon black. This cell was also discharged across a load of 10.9 ohms producing the discharge curve illustrated in FIG. 4. The cell capacity to a cutoff of 2.5 volts with 30.5 mA.h/cm$^2$. This result is an improvement of 180% over the capacity of the conventional cell employing a carbon cathode current collector as described in Example IV.

While there has been shown and described what are considered preferred embodiments of the present invention, it will be obvious to those skilled in the art that various changes and modifications may be made therein without departing from the invention as defined by the appended claims.

What is claimed is:

1. An electrochemical cell comprising
   an oxidizable active anode material;
   a cathode current collector consisting of a mixture of a polymer and carbon black, and a supporting substrate; said polymer being selected from the group consisting of polyacetylenes, polyphenylenes, polyheterocyclics, mixtures thereof, copolymers thereof, and cross linked polymers thereof; and
   an electrolytic solution, in contact with the anode material and cathode current collector, comprising a reducible liquid cathode material and an electrolyte solute dissolved therein.

2. An electrochemical cell in accordance with claim 1 wherein
   the oxidizable anode material is selected from the group consisting of alkali metals and alkaline earth metals.

3. An electrochemical cell in accordance with claim 2 wherein
   the reducible liquid cathode material is selected from the group consisting of fluid oxyhalides, fluid non-metallic oxides, fluid non-metallic halides, and mixtures thereof.

4. An electrochemical cell in accordance with claim 1 wherein
   said mixture of a polymer and carbon black contains more than 10% by weight of said polymer.

5. An electrochemical cell in accordance with claim 4 wherein
   the oxidizable anode material comprises lithium metal; and
   the reducible liquid cathode material comprises thionyl chloride.

6. An electrochemical cell comprising
   an oxidizable active anode material;
   a cathode current collector consisting of a layer of a polymer adherent to an inert electrically-conductive substrate; said polymer being selected from the group consisting of polyacetylenes, polyphenylenes, polyheterocyclics, mixtures thereof, copolymers thereof, and cross linked polymers thereof; and
   an electrolytic solution, in contact with the anode material and cathode current collector, comprising a reducible liquid cathode material and an electrolyte solute dissolved therein.

7. An electrochemical cell in accordance with claim 6 wherein the oxidizable anode material is selected from the group consisting of alkali metals and alkaline earth metals.

8. An electrochemical cell in accordance with claim 7 wherein
the reducible liquid cathode material is selected from the group consisting of fluid oxyhalides, fluid non-metallic oxides, fluid non-metallic halides, and mixtures thereof.

9. An electrochemical cell in accordance with claim 8 wherein
the oxidizable anode material comprises lithium metal; and
the reducible liquid cathode material comprises thionyl chloride.

10. An electrochemical cell in accordance with claim 8 wherein
said inert electrically-conductive substrate is a thin metal foil.

* * * * *